H. D. JAMES.
CONTROLLER.
APPLICATION FILED SEPT. 21, 1916.
1,406,389.
Patented Feb. 14, 1922.
2 SHEETS—SHEET 1.
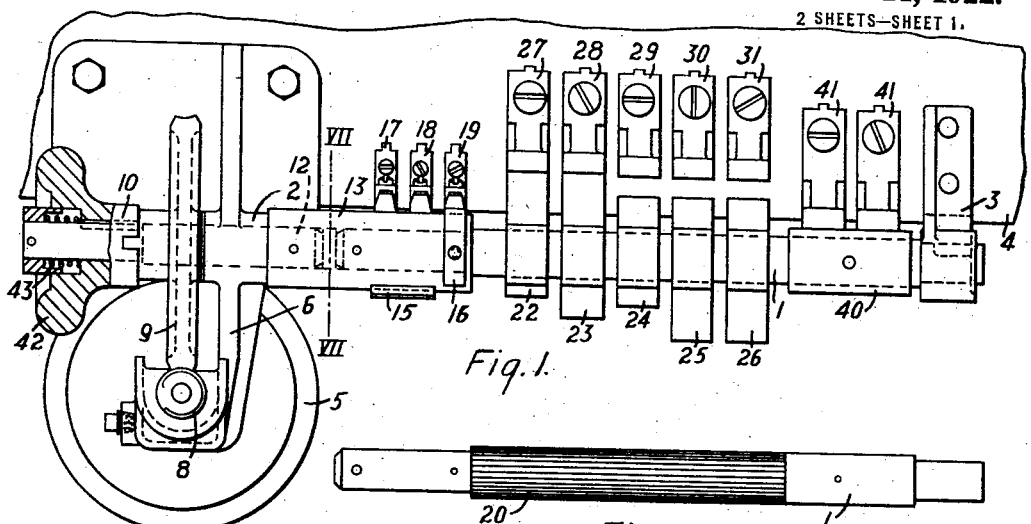
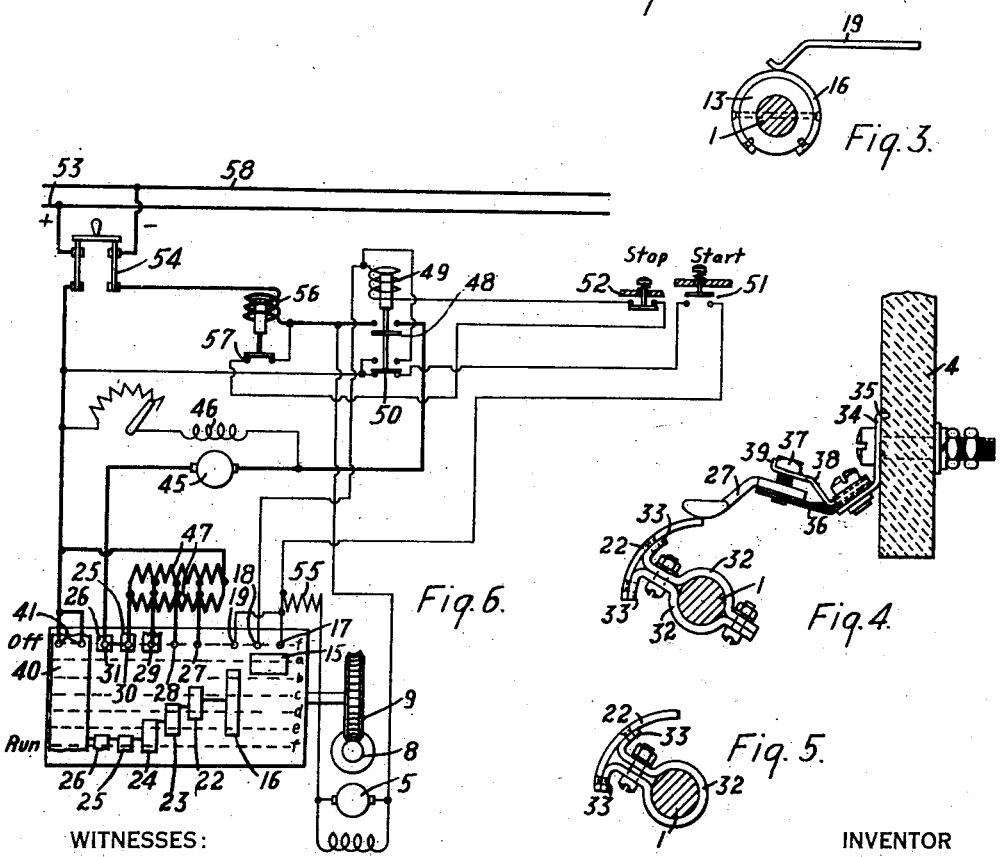
WITNESSES:
Fred. A. Lind.
J. R. Langley
INVENTOR
Henry D. James
BY
Wesley G. Carr
ATTORNEY

UNITED STATES PATENT OFFICE.

HENRY D. JAMES, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CONTROLLER.

1,406,389.

Specification of Letters Patent. Patented Feb. 14, 1922.

Application filed September 21, 1916. Serial No. 121,382.

*To all whom it may concern:*

Be it known that I, HENRY D. JAMES, a citizen of the United States, and a resident of Edgewood Park, in the county of Allegheny and State of Pennsylvania, have invented a new and useful Improvement in Controllers, of which the following is a specification.

My invention relates to controllers for governing the circuits of electric motors, and it has, for one of its objects, to provide a controller that is simple and economical in construction and is automatic in operation to effect the starting of an electric motor.

A second object of my invention is to provide a device of the character indicated above which operates in a single direction to control the operation of an electric motor in connection with which it is employed.

A controller constructed in accordance with my invention embodies few and simple parts, a number of which may be constructed by punching or some other simple method, and which may be readily assembled. The members for supporting certain of the movable contact segments are clamped to the controller shaft and have portions of suitable shape to receive the segments. Each of the movable contact segments is provided with a curved engaging surface having a radius of minimum length consistent with the function it performs.

The controller is actuated by a pilot motor to which it is operatively connected by a releasable clutch in order that the controller may be operated manually, if so desired. The circuits of the pilot motor are so arranged and controlled that it actuates the controller drum continuously through a complete cycle upon each closure of the circuit of the pilot motor. The controller thus operates in a single direction from its initial position to the same position, which is also the runnng position for the main motor.

The advantages of a controller arranged to operate in the manner above described are that additional field windings for reversing the pilot motor or the provision of controlling mechanism for effecting the reversal of the armature connections are entirely unnecessary. The entire operation of starting and accelerating the motor is controlled automatically by the pilot motor upon the initiation of its operation.

Figure 7:
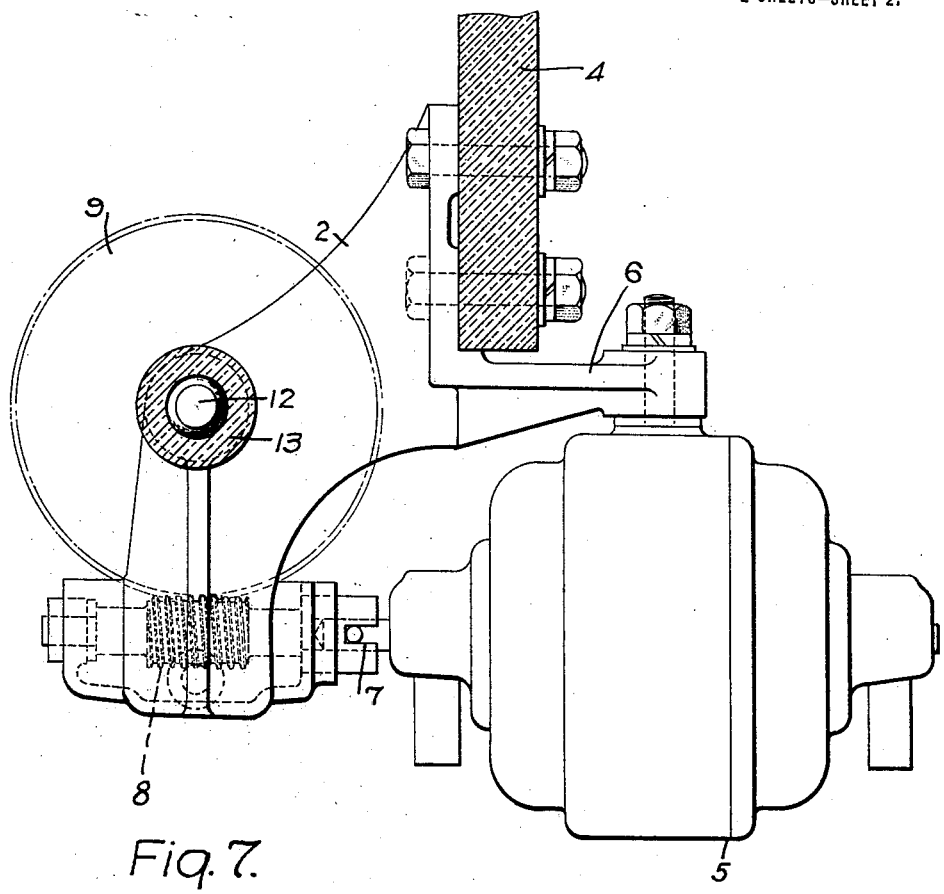
Figure 8:
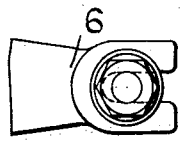

The details of my invention will be described in connection with the accompanying drawings, in which Fig. 1 is a view, partially in elevation and partially in section, of a controller constructed in accordance with my invention. Fig. 2 is a view, in elevation, of the controller shaft. Fig. 3 is a view, in section, of the controlling mechanism of Fig. 1, illustrating one of the movable contact members and its coacting contact finger. Fig. 4 is a view, in section, of the controlling mechanism of Fig. 1, illustrating, in detail, the manner of supporting certain of the movable contact segments and the structure of certain of the contact fingers. Fig. 5 is a sectional view of a modification of one of the elements shown in Fig. 4. Fig. 6 is a diagrammatic view of the circuits of an electric motor that are controlled by a controller constructed in accordance with my invention. Fig. 7 is a view in section on line VII—VII of Fig. 1, of the mechanism of Fig. 1. Fig. 8 is a plan view of a portion of the means for supporting the pilot motor.

Referring particularly to Figs. 1 and 7, a rotatable shaft 1 is supported by bearing members 2 and 3 that are secured to a base member 4 of slate or other suitable isulating material, only a part of the latter being shown. The shaft 1 is adapted to be actuated by a pilot motor 5. The pilot motor is suspended from the base member 4 by an arm 6 that is integral with the bearing member 2 and is provided with a yoke at its outer end (Fig. 8).

The motor 5 is operatively connected to the controller shaft 1 by means of a flexible coupling 7, of the nature of a universal joint, a worm 8, a worm wheel 9, a clutch mechanism 10, a shaft 12 that is in alinement with the shaft 1, and a sleeve 13 of insulating material that is rigidly connected to the shafts 12 and 1.

The rotatable contact members of the controller comprise contact segments 15 and 16 that are mounted upon the insulating coupling member 13 to coact with stationary contact fingers 17, 18 and 19. The arrangement of the contact segment 16, the sleeve 13, and the shaft 1 is shown in Fig. 3.

The shaft 1 may be provided with a knurled portion 20, as illustrated in Fig. 2, upon which are mounted contact segments 22, 23, 24, 25 and 26 that respectively coact with contact fingers 27, 28, 29, 30, and 31. As best shown in Fig. 4, each of the contact segments 22 to 26, inclusive, is mounted upon a support 32 which is shown as comprising two metal strips of such form as to fit around the knurled portion 20 of the shaft and be clamped thereto by means of bolts and nuts. The member 32 is provided with curved projecting portions 33 that extend in opposite directions to receive the corresponding contact segment, which may be secured thereto, as shown. Instead of employing two strips of metal to provide the clamp-support 32, as shown in Fig. 4, a single strip may be bent as shown in Fig. 5 and the two arms may be fastened together at one side only of the shaft 1 by means of a single fastening device. Either of the forms shown or any other modified form that may be adopted within the scope of my invention may be adjusted either longitudinally or circumferentially, or both longitudinally and circumferentially, upon the knurled portion 20 of the shaft 1 to properly cooperate with such stationary contact terminals as may be employed.

The details of the construction of the contact finger 27, which are identical with those of the contact fingers 28, 29, 30 and 31, are illustrated in Fig. 4. The supporting member 34, which is formed by punching a strap or bar of metal, is provided with a bent portion 35 for projecting into a suitable recess in the base member 4, to prevent rotative movement about the fastening screw. The contact finger 27 is secured to the supporting member 34 by a spring 36 and a bolt 37. The bolt 37 extends through a suitable opening in a stop member 38 which serves to guide and to limit the movement of the contact finger 27 relatively to the supporting member 34. The stop member 38 is provided with an upwardly extending portion 39 for locking the bolt 37 in any position to which it may be adjusted.

The controller is further provided with a contact member 40, of copper or other suitable material, that is of ring shape and is rigidly secured to the shaft 1. A pair of contact members 41, which may be electrically connected in parallel relation, coact with the member 40. The provision of a contact member of ring shape and having a small diameter is of advantage because the friction of the relatively movable parts is materially decreased and a smaller amount of energy is required to drive the shaft by reason of the fact that the frictional engagement of the parts occurs at a relatively small distance from the axis of the shaft. In addition, a contact ring of small diameter contains a correspondingly small amount of material.

The shaft 1 and its connected parts are normally actuated by the pilot motor through the operative connection described above. The shaft 1 may be operated manually, when so desired, by actuating a hand wheel 42 that is splined upon the shaft 12 and has a clutch engagement with the hub of the gear wheel 9. When the hand wheel 42 is actuated to the left, as viewed in Fig. 1, the shaft 12 is disconnected from the gear wheel 9 and the controller may be actuated manually to any desired position. A spring 43 yieldingly maintains the hand wheel 42 in its illustrated position to connect the gear wheel 9 to the shaft 12. This arrangement provides a convenient means for causing the main motor to operate temporarily at an intermediate speed or for changing its rate of acceleration for making adjustments to the driven machinery.

Reference may now be had to Fig. 6 in which a development of the controller is illustrated in connection with the circuits of an electric motor. An electric motor, which may operate to drive a machine or other suitable load, has an armature 45 and a shunt field-magnet winding 46. A pair of starting resistors 47, which are connected in parallel relation, are controlled by the coacting contact members 22 to 31, inclusive.

The armature circuit of the motor is controlled by an electromagnetically-operable line switch 48 having an actuating coil 49. A switch 50, which is mechanically interlocked with the switch 48, controls a holding circuit for the coil 49. The operation of the system is controlled by two push buttons 51 and 52 which operate to produce the respective effects upon the main motor that are indicated by legends placed adjacent to the switches.

It may be assumed that the controller occupies its illustrated or initial position. To start the main motor, the push-button switch 51 is actuated to close a circuit which extends from line conductor 53 through switch 54, switch 50, push-button switch 51, a resistor 55, armature of pilot motor 5, actuating coil 56 of overload relay 57 and switch 54 to line conductor 58. The pilot motor 5 now operates to rotate the shaft 1 of the controller in a clockwise direction, as viewed from the right in Fig. 6, or in a counter-clock-wise direction, as viewed from the right in Fig. 1.

In the first position of the controller, which is indicated at $a$, the contact segment 15 engages contact fingers 17 and 18 to complete a circuit for the coil 49 of line switch 48 which extends from the positive side of switch 54 through switch 50, push-button switch 51, contact finger 17, contact segment 15, contact finger 18, coil 49, push-button switch 52, overload relay 57 and coil 56 to the negative side of switch 54.

The line switch 48 then closes to complete the armature circuit for the main motor which extends from the positive side of the line, through resistors 47, in parallel, contact fingers 30 and 31, which are permanently electrically connected, armature 45, switch 48 and coil 56 to the negative side of the line. The main motor then operates with the entire resistors 47 in circuit.

Simultaneously with the closing of the line switch 48, the circuit of the pilot motor is momentarily interrupted at 50, but a new circuit is immediately established by the upper contact member of the switch 50 through the segment 15 and the fingers 17 and 18, thus shunting the push-button switch 51. The push-button switch may then be released.

In the second position of the controller, which is designated by *b*, the contact segment 16 engages contact finger 19 to complete the circuit of the pilot motor 5 through the several contact segments 16, 22 to 26, and 40, to the positive side of the line. The control of the pilot-motor circuit is thus shifted to the controller.

In position *c* of the controller, contact segment 22 engages contact finger 27 to shunt one section of each of the resistors 47. In each of the succeeding positions *d*, *e* and *f*, an additional section of each of the resistors is shunted, the entire resistors being shunted in the normal running position of the controller which coincides with its inoperative position, in which it is illustrated. When the controller passes from position *e*, contact segment 16 and contact finger 19 are disengaged to open the circuit of the pilot motor, and the controller is brought to rest in its illustrated position. To stop the main motor, push-button switch 52 is operated to open the line conductor.

It will be noted that the controller is actuated through a complete cycle by a continuous rotation of the pilot motor 5 in a single direction. The controller drum is actuated in the same direction for each succeeding operation. Means are provided, however, for opening the circuit of the main motor at any desired time, regardless of the position of the controller.

When the line switch is closed, the switch 50, that is mechanically connected thereto, completes a holding circuit for the coil 49 which extends from the positive side of the line, through switch 50, coil 49, switch 52, overload relay 57 and coil 56, to the negative side of the line. The line switch may be opened at any desired time by the actuation of the push-button switch 52 to open the circuit of the coil 49, traced above. The armature circuit of the main motor is then broken and the motor comes to rest. The stopping of the main motor does not, in any way, affect the operation of the pilot motor, and the latter continues to actuate the controller to its initial or inoperative position. The switch 50 serves not only to complete the circuit through the pilot motor when operation is initiated by the push-button 51, but also to prevent operation of the pilot motor and the controller when the switch 48 is closed and the main motor is operating under normal conditions.

It will be noted that a controller constructed as above described may be manufactured and assembled with a minimum amount of time and labor. Since parts may be formed from materials of usual and ordinary shape, an economical construction is assured.

The use of a controller that is adapted to operate to effect the starting and acceleration of the motor in connection with which it is employed and is returned to its initial position by a continuous movement in a single direction, permits the employment of a pilot motor of the usual and ordinary type. It is neither necessary to provide additional windings for operation of the pilot motor in reverse directions nor to include reversing mechanism in the means for controlling the pilot motor.

It is possible also, by means of a controller arranged as previously described, to provide a system which comprises a single line switch and a single fuse in the armature circuit of the motor. One side of the line is always connected to the contact segments of the controller when the double-pole knife switch 54 is closed.

An additional advantage secured by my arrangement is the elimination of substantially all of the insulation that is usually required in devices of this character, the insulating coupling for the driving shafts being the only insulating member required. It will be noted that the several contact fingers are mounted directly upon the base member of slate or other insulating material and that the latter constitutes the only insulation that is necessary between the several members. It is unnecessary, also, to insulate the rotatable shaft from the bearing members since the latter are directly mounted upon the insulating base.

The suspension of the pilot motor beneath the lower edge of the base permits the location of the motor at the rear of the switchboard, where it will not occupy valuable space, and this result is achieved without the necessity of providing a hole through the base member in order that the several parts may be operatively connected. The provision of a flexible coupling and a yoke member upon which the motor may be adjustably mounted insures that the motor and the connected parts may be readily assembled and that the motor will operate efficiently to drive the worm shaft even though the armature shaft is not in alinement therewith.

I claim as my invention:

1. The combination with an electric motor, a switch for closing the circuit of said motor and having an actuating coil, and a controller for said motor and for closing the circuit of said coil, of means for continuously operating said controller through a complete cycle, and means for opening the circuit of said coil without affecting the completion of said cycle.

2. In a controller, the combination with a rotatable shaft and a plurality of coacting contact members controlled thereby, of an electric motor operatively connected to said shaft, means independent of said contact members for starting said motor, and means, comprising certain of said contact members, for causing said motor to actuate said shaft in a single direction through successive complete cycles of operation.

3. In a system of control, the combination with a motor, a controller that is operable in a single direction for controlling said motor, and a pilot motor for operating the controller, of a manually operated switch for completing the circuit of the pilot motor to initiate the movement of the controller, and means for preventing the closing of the circuit of the pilot motor when the main motor is energized.

4. The combination with an electric motor and a controller therefor, of a switch for closing the circuit of said motor, electroresponsive means for actuating said controller, and means for directly closing the circuit of said electroresponsive means irrespective of the position of said controller and for closing said switch when said controller occupies a predetermined position.

5. The combination with an electric motor and a controller therefor, of a switch for closing the circuit of said motor, an actuating coil for said switch, an overload relay for controlling the circuit of said coil, and a pilot motor for actuating said controller through a complete cycle independently of the operation of said overload relay.

6. The combination with an electric motor and a controller therefor, of a switch for closing the circuit of said motor and having an actuating coil, a pilot motor for actuating said controller, the circuit of said pilot motor and the circuit of said coil comprising said switch when said switch occupies its open position, and a switch for closing the circuit of said pilot motor to actuate said controller to a predetermined position and for closing the circuit of said coil when said controller reaches said predetermined position.

7. The combination with an electric motor and electroresponsive means for accelerating said motor, of a switching device for closing the circuit of said motor and having an actuating coil, said device being adapted to control the circuits of said coil and said electroresponsive means.

8. The combination with an electric motor, and a controller therefor having a definite cycle of operation, of a plural-position switching device for maintaining the circuit of said motor closed and for controlling the operation of said controller through a portion of said cycle when said device occupies one of its positions and for controlling the operation of said controller through another portion of said cycle when said device occupies another of its positions.

9. The combination with a motor, a switch for closing the circuit of said motor and a controller for governing the operation of said motor, of means associated with said switch for initiating the operation of said controller, and means for operating said controller independently of said associated means.

10. The combination with a machine, and an electric motor for controlling said machine, of a two-position switch for partly closing the circuit of said motor in one of its positions and for controlling said machine in its other position, a switch for closing said circuit when said two-position switch occupies said one position, and means for actuating said two-position switch to its other position.

11. The combinatiton with an electric motor and a controller therefor, of a switch for closing the circuit of said motor and having an actuating coil, a double-throw switch mechanically connected to said first-named switch, a pilot motor for actuating said controller, the circuit of said pilot motor and the circuit of said coil comprising said double-throw switch when said first-named switch is open, and a switch for closing the circuit of said pilot motor to actuate said controller to a predetermined position and for closing the circuit of said coil when said controller reaches said predetermined position, said double-throw switch establishing maintaining circuits for said pilot motor and said coil when said first-named switch is closed.

12. The combination with an electric motor and a switch for closing the circuit of said motor, of a controller for said motor, a pilot motor for actuating said controller, a double-throw switch mechanically connected to said closing switch, a manually operable switch for closing the circuit of said pilot motor when said double-throw switch occupies one of its positions, and means for shunting said manually operable switch when said double-throw switch occupies its other position.

In testimony whereof I have hereunto subscribed my name this 7th day of Sept., 1916.

HENRY D. JAMES.